United States Patent [19]

Weslake

[11] 4,036,202
[45] July 19, 1977

[54] INTERNAL COMBUSTION ENGINES

[76] Inventor: Henry Weslake, Maryland, Point Hill, Rye, England

[21] Appl. No.: 606,092

[22] Filed: Aug. 20, 1975

[30] Foreign Application Priority Data

Aug. 23, 1974 United Kingdom ............... 37194/74
Nov. 7, 1974 United Kingdom ............... 48231/74

[51] Int. Cl.² .................... F02B 17/00; F02B 19/00; F01L 3/22
[52] U.S. Cl. ............................ 123/32 ST; 123/30 D; 123/75 B; 123/188 S; 123/191 S
[58] Field of Search .......... 123/32 ST, 32 SP, 32 SA, 123/30 C, 30 D, 32 K, 33 D, 33 VC, 75 B, 191 S, 191 SP, 188 S, 193 H, 143 B, 143 R

[56] References Cited

U.S. PATENT DOCUMENTS

| 1,649,700 | 11/1927 | Jobes | 123/75 B |
| 1,998,785 | 4/1935 | Mock | 123/75 B X |
| 2,242,990 | 5/1941 | Brown | 123/32 ST |
| 3,283,751 | 11/1966 | Goossak et al. | 123/119 R X |
| 3,762,381 | 10/1973 | Dave | 123/188 S X |
| 3,918,419 | 11/1975 | Dolza, Sr. | 123/75 B |
| 3,926,158 | 12/1975 | Dolza, Sr. | 123/75 B |
| 3,980,060 | 9/1976 | Noguchi et al. | 123/75 B X |

FOREIGN PATENT DOCUMENTS

| 1,003,257 | 9/1965 | United Kingdom | 123/191 S |
| 971,519 | 9/1964 | United Kingdom | 123/191 S |

Primary Examiner—Ronald H. Lazarus
Assistant Examiner—Tony M. Argenbright
Attorney, Agent, or Firm—Watson, Cole, Grindle & Watson

[57] ABSTRACT

An internal combustion engine has a cylinder containing a piston, a valve controlled inlet port for air/fuel mixture and an ignition sparking plug. A branch passage leads from the inlet port to a location adjacent the plug, the branch passage being opened by initial movement of the valve before the part as a whole is opened to deliver mixture initially to the plug for ignition and, on full opening of the valve, mixture is delivered to the cylinder as a whole.

12 Claims, 8 Drawing Figures

INTERNAL COMBUSTION ENGINES

BACKGROUND OF THE INVENTION

1. Field of the Invention

This invention relates to internal combustion engines.

2. Description of the Prior Art

Internal combustion engines have been proposed having stratified charging in which air only is admitted through the inlet valve and fuel is injected directly into the combustion chamber and ignited by a plug located adjacent to the injection nozzle where the air/fuel mixture is rich and ignitable. The combustion thus initiated should burn up the remainder of the fuel in the cylinder which is mixed with the air in the form of a layer of very lean mixture superimposed in a layer of air over the piston. Engine speed is controlled by varying the amount of petrol injected. Such engines have not in practice prooved satisfactory because of difficulties in controlling engine speed by controlling the fuel supply only. A modified type of stratified engine has also be proposed having rich mixture ante chambers fed through separate inlet valves with inlet throttling of a carburetor supplying a very weak mixture through a conventional inlet valve. Such an engine can be controlled satisfactorily but has a high cost due to the additional equipment required.

It is an object therefor of the applicant's invention to provide an internal combustion engine in which improved ignition of the initial mixture is achieved without requiring additional equipment such as an additional carburettor and separate inlet valve.

SUMMARY OF THE INVENTION

In internal combustion engine having at least one cylinder containing a reciprocable piston, an inlet passage for air or air/fuel mixture leading to the engine cylinder, means to ignite the air/fuel mixture, a branch passage leading from the inlet passage to the ignition means to deliver air or air/fuel mixture thereto, and a valve for opening and closing both the inlet and branch passages, opening movement of the valve opening the branch passage prior to the inlet passage so that initially air or air/fuel mixture is supplied to the ignition means and, on opening of the inlet passage is supplied direct to the engine cylinder.

DESCRIPTION OF THE PREFERRED EMBODIMENTS

Figure 1:
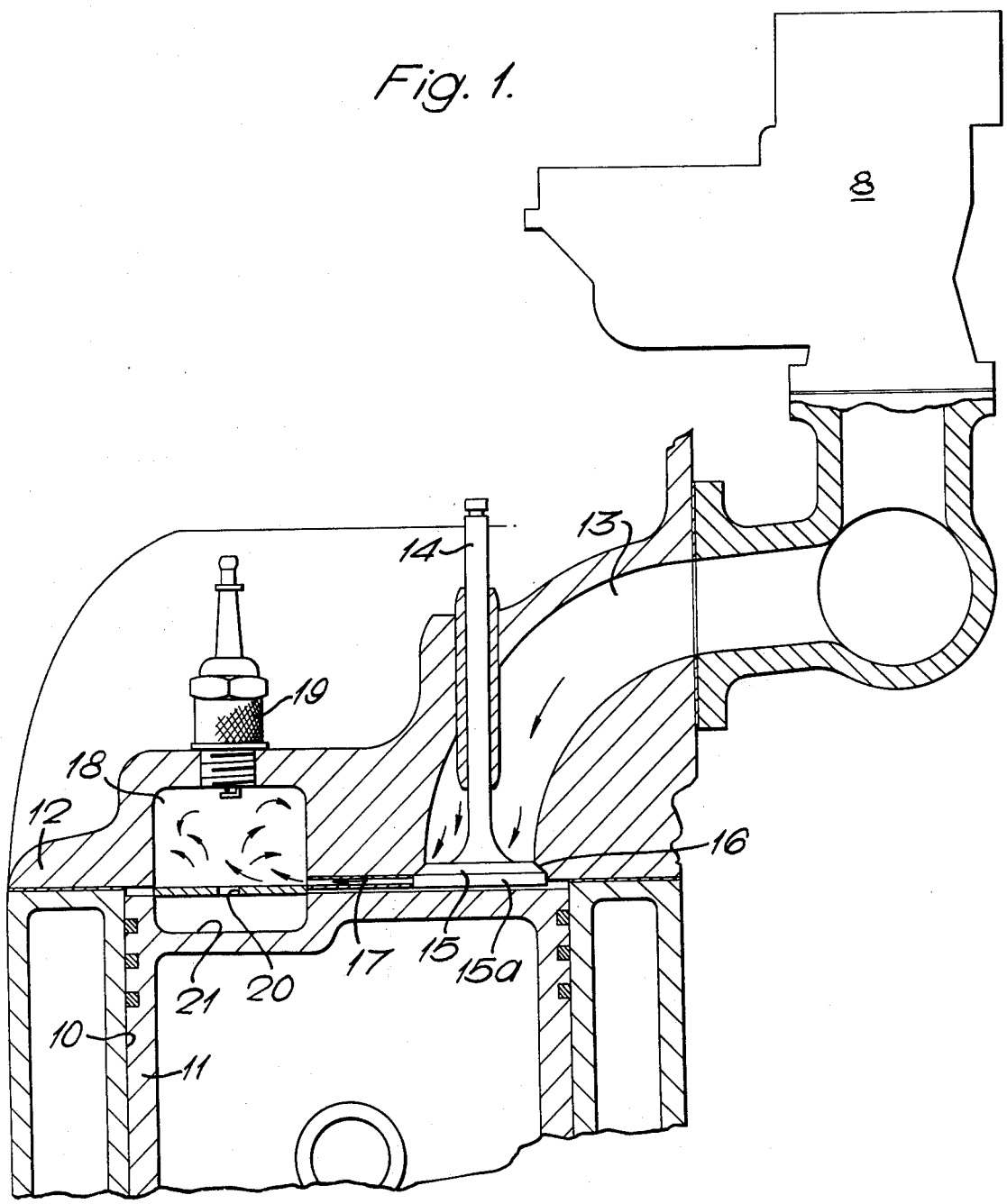
FIG. 1 is a sectional view of part of an internal combustion engine with the air/fuel mixture supplied by a carburetor.

The drawing shows part of an internal combustion engine including a cylinder 10 containing a reciprocable piston 11 and part of a cylinder head 12. Air/fuel mixture is supplied from a carburetor to an inlet passage 13 which is opened and closed by a poppet valve 14. The poppet valve has a deeper head 15 than is usual formed by an annular dependent shirt 15a and a valve seat 16 is formed in the inlet passage adjacent to but spaced a small distance from the end of the inlet passage. A branch passage 17 is drilled through the cylinder head from the wall of the inlet passage between the seat 16 and the end of the inlet passage. The branch passage extends to a pre-combustion chamber 18 formed in the cylinder head. The pre-combustion chamber has a spark plug 19 connected in the usual engine ignition system to ignite air/fuel mixture in the chamber and an orifice 20 between the pre-combustion chamber and engine cylinder controls the flow rate of burning mixture into the cylinder and also the flame speed through the mixture from the chamber to the cylinder.

Opening movement of the valve 14 initially opens the branch passage 17 to supply air/fuel mixture to the pre-combustion chamber 18, and further opening of the valve opens the inlet passage to the engine cylinder for supply of mixture direct to the cylinder.

The initial part of a charge of air and fuel supplied by a carburetor 8 is richer in fuel than the subsequent part as all carburetors automatically supply a mixture which is initially fuel rich because of the concentration of fuel at the jet before flow through the carburetor starts. Once the concentration of fuel has been discharged by the carburetor, the subsequent mixture is leaner. Thus the initial rich part of the mixture is supplied to the pre-combustion chamber whereas the weaker part of the mixture is supplied to the cylinder. When the rich mixture is ignited, the burning mixture expands and a jet of the burning mixture is delivered through the orifice 20 into the cylinder. The crown of the piston is formed with a bowl 21 opposite the orifice to promote turbulence between the jet and the mixture in the cylinder to ensure thorough mixing of the rich burning mixture with the weak mixture in the cylinder and complete combustion of the latter without detonation of any unburnt mixture.

The arrangement provides a relatively weak charge of fuel and air to be supplied to the cylinder which would not ignite when subjected only to a spark, and uses the burning rich mixture ignited in the pre-combustion chamber to ignite the weaker mixture. Thus the overall mixture can be relatively weaker than is normal and, as a result, fuel consumption is reduced and there is less emission of unburned hydro-carbons and carbon monoxide.

As the inlet valve closes, the inlet passage 13 is closed first and the branch passage remains open briefly to deliver further mixture to the pre-combustion chamber until it too is closed by the valve.

Figure 1A:
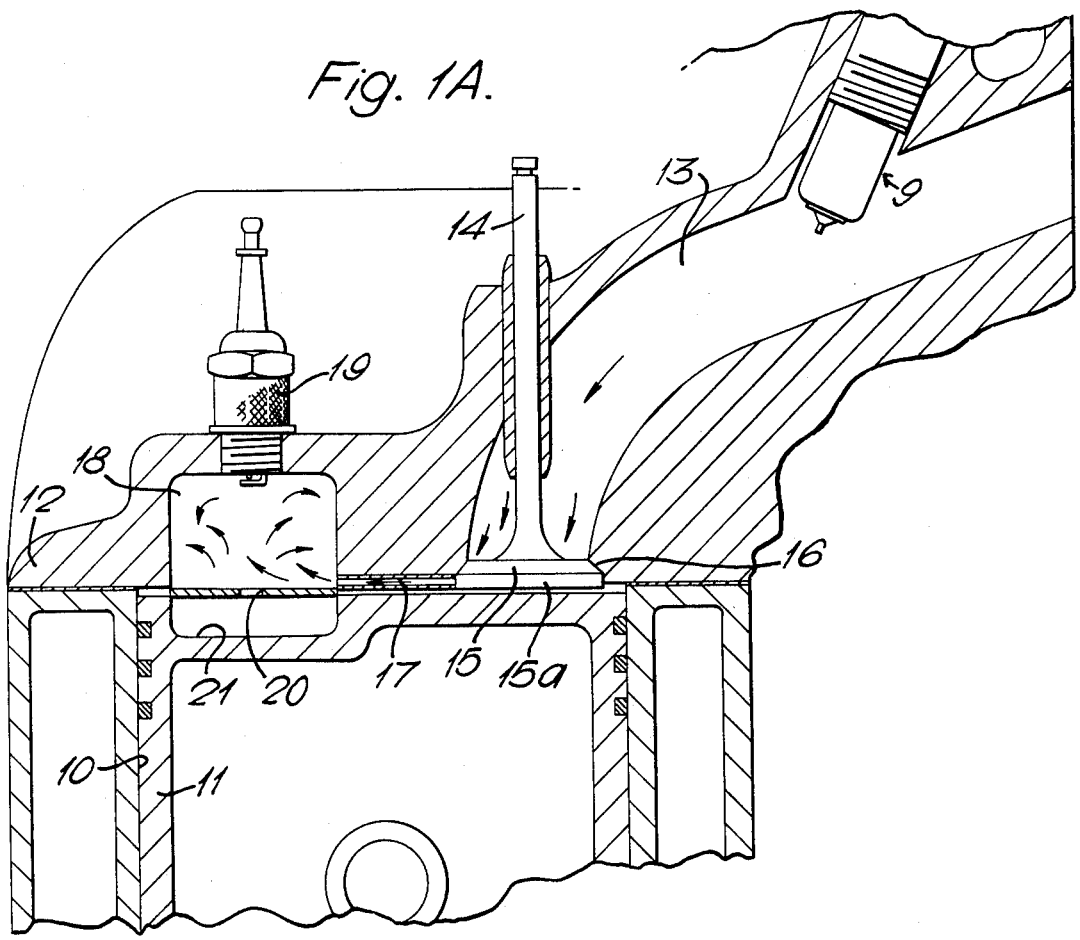
FIG. 1A shows an engine similar to that of FIG 1 with the fuel supplied by a fuel injector.

Although the above described arrangement has a carburetor supplying mixture to the inlet passage, it is also possible to inject fuel into the inlet passage or direct into the pre-combustion chamber b a fuel injector 9 as shown in FIG. 1A. Other than the use of a fuel injector in lieu of a carburetor, the operation of FIG. 1A is identical to that of FIG. 1.

Figure 2:
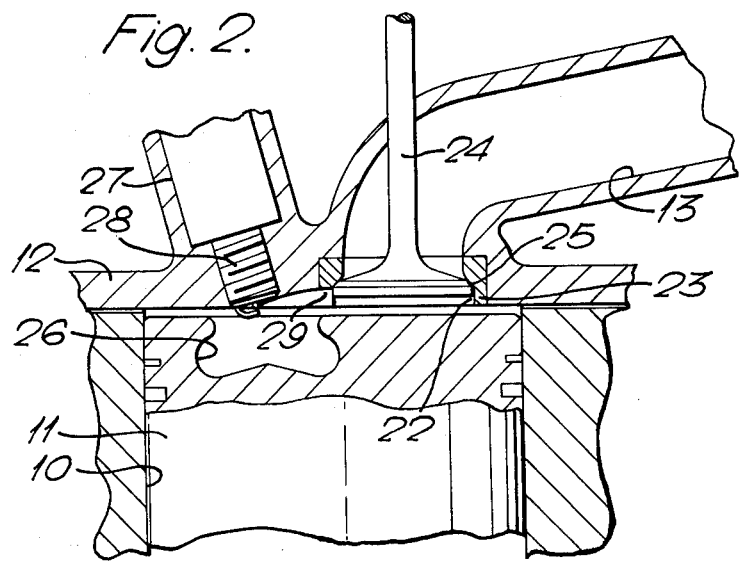
FIG. 2 is a sectional view in a vertical plane through part of another internal combustion engine.
Figure 3:
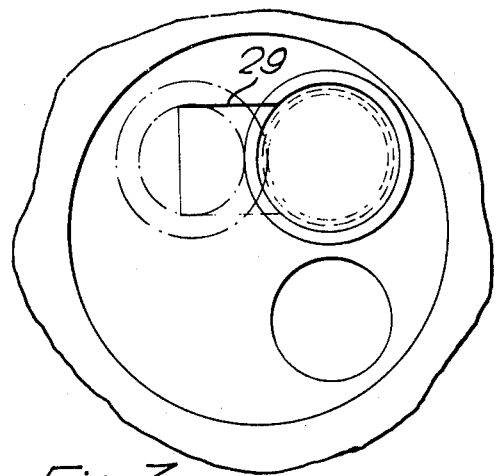
FIG. 3 is a plan view of the part of the engine shown in FIG. 2.

Referring now to FIG. 2 of the drawings, there is shown part of an internal combustion engine including a cylinder 10 containing a reciprocable piston 11 and part of a cylinder head 12. Air/fuel mixture is supplied from carburetor (not shown) to an inlet passage 13 terminating in an inlet port 22 formed in a separate annular insert 23 let into the cylinder head at the end of the inlet passage 13. A conventional poppet valve 24 is provided in the inlet port 22 and the insert 23 is formed with an annular seat 25 which the valve head abuts close the port.

The piston 11 is formed with a recess 26 in the outer face of the crown thereof to one side of the inlet port 14 to provide a pre-combustion chamber.

The cylinder head 12 is formed with the usual bore 27 in which a sparking plug 28 is located immediately above the pre-combustion chamber 26.

A wide slot 29 substantially equal to the diameter of recess 26 is cut in the cylinder head 12 from a location above the pre-combustion chamber 26 in the piston crown and through the wall of the insert 23 below the seat 25 to open into the inlet port 22. The bottom of the slot 29 is smoothly curved and converges to the underface of the cylinder head at the end of the slot over the pre-combustion chamber to direct air/fuel mixture passing through the slot down into the pre-combustion chamber.

The initial opening movement of the valve 24 opens the inlet passage 13 to the slot 29 so that the initially rich air/fuel mixture in the inlet passage is delivered to the pre-combustion chamber 26. As the valve 24 opens further, the inlet port 22 is opened and the subsequent relatively leaner mixture is delivered to the cylinder as a whole. Since the richer mixture is initially delivered to the combustion chamber 26 fires readily, the burning mixture fires the leaner mixture subsequently delivered to the inlet port.

By varying the width of the slot, directional flow of the fuel/air mixture can be obtained as well as the velocity of the mixture. Furthermore, a high rate of rotational swirl can be imparted to the mixture on initial opening of the valve and even more important, there is an increase in swirl as the valve is closing. A very high rate of swirl can considerably reduce air flow so that if one can achieve the maximum amount of swirl at the beginning and at the end of the induction stroke with a low rate of swirl on the higher valve lifts, then maximum volumetric efficiency will be obtained.

Figure 4:
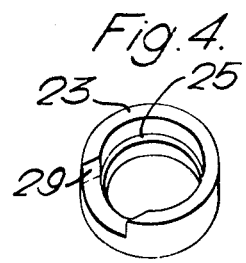
FIG. 4 is a detailed view of one component of the arrangement shown in FIGS. 2 and 3.
Figure 5:
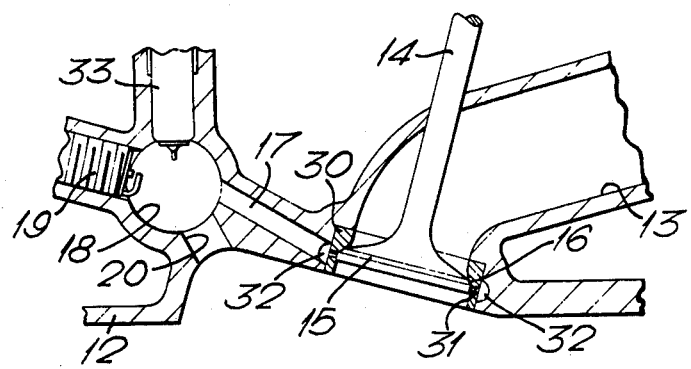
FIGS. 5 to 7 show further embodiments according to the invention.

FIGS. 4 and 5 of the drawings show further embodiments which are generally similar to that described and illustrated in FIG. 1 and like parts have been allotted the same reference numerals.

In the arrangement of FIG. 4, the valve port and seat 16 are formed in a separate annular insert 30 let into the cylinder head. Just below the seat 16 there are a series of radial drillings 31 which communicate with an annular passage 32 encircling the insert. The aforesaid passage 17 leads from the passage 32 to the pre-combustion chamber 18. Thus initial opening movement of the valve opens the inlet passage 13 which supplies air only to the drillings 31 to supply air through passages 32 and 17 to the pre-combustion chamber 18 which has a fuel injector 33 for supplying fuel thereto.

FIG. 5 shows a further similar arrangement in which an annular slot 34 is provided between the underside of the insert 30 and the annular passage 32 to deliver air thereto as the valve initially opens.

Figure 6:
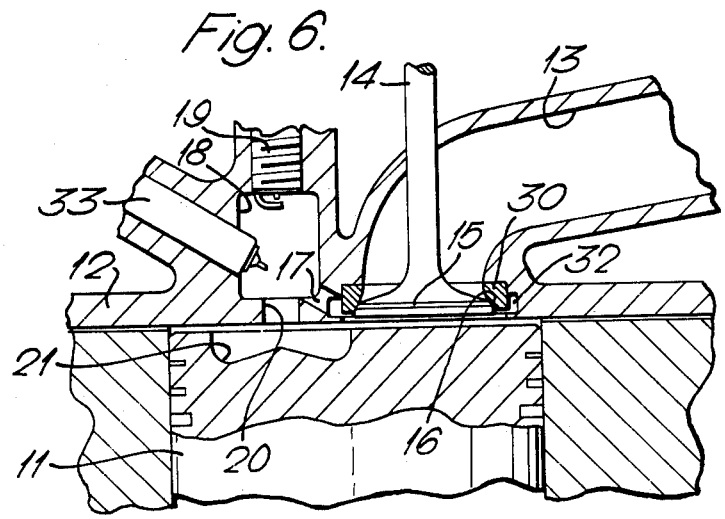

FIG. 6 of the drawings shows an arrangement which is generally similar to that of FIG. 5 and again like parts have been allotted the same reference numerals. In this case however the pre-combustion chamber 26 formed in the crown of the piston 11 extends across the greater part of the surface of the piston and is located opposite both the valve controlled inlet port 22 so that the valve 24 can extend into the recess when the piston is at the top of its stroke and opposite the outlet end of the passage 20 from the pre-combustion chamber 18.

The pre-combustion chamber 18 has a fuel injector 28 which is timed to inject a change of fuel into the chamber prior to opening of the inlet valve. When the valve opens initially, air delivered from the inlet passage direct to the pre-combustion chamber 18 carries the fuel through the pre-combustion chamber and into the combustion chamber proper in the piston crown located below the outlet from chamber 26. Thus substantially all of the fuel is collected in the chamber 26 and little or no fresh fuel reaches the cylinder walls where the fuel burns badly and is usually emitted as noxious fumes in the engine exhaust.

Since air only is admitted through the inlet passage 13, the deleterious effects of mixing fuel vapour with the air which reduces the total air change admitted to the engine cylinder are minimised.

The concentration of fuel in the recess in the piston crown provides a rich mixture which can be readily fired using the spark plug 19. Thus the ignition advance can be set at a relatively low amount in the region of 15°.

Since the valve head can enter the recess 26 in the piston crown the valve opening can be maximized even when the piston is at top-dead centre and the valve can continue to open to an even greater extent as the piston descends in its cylinder.

Figure 7:
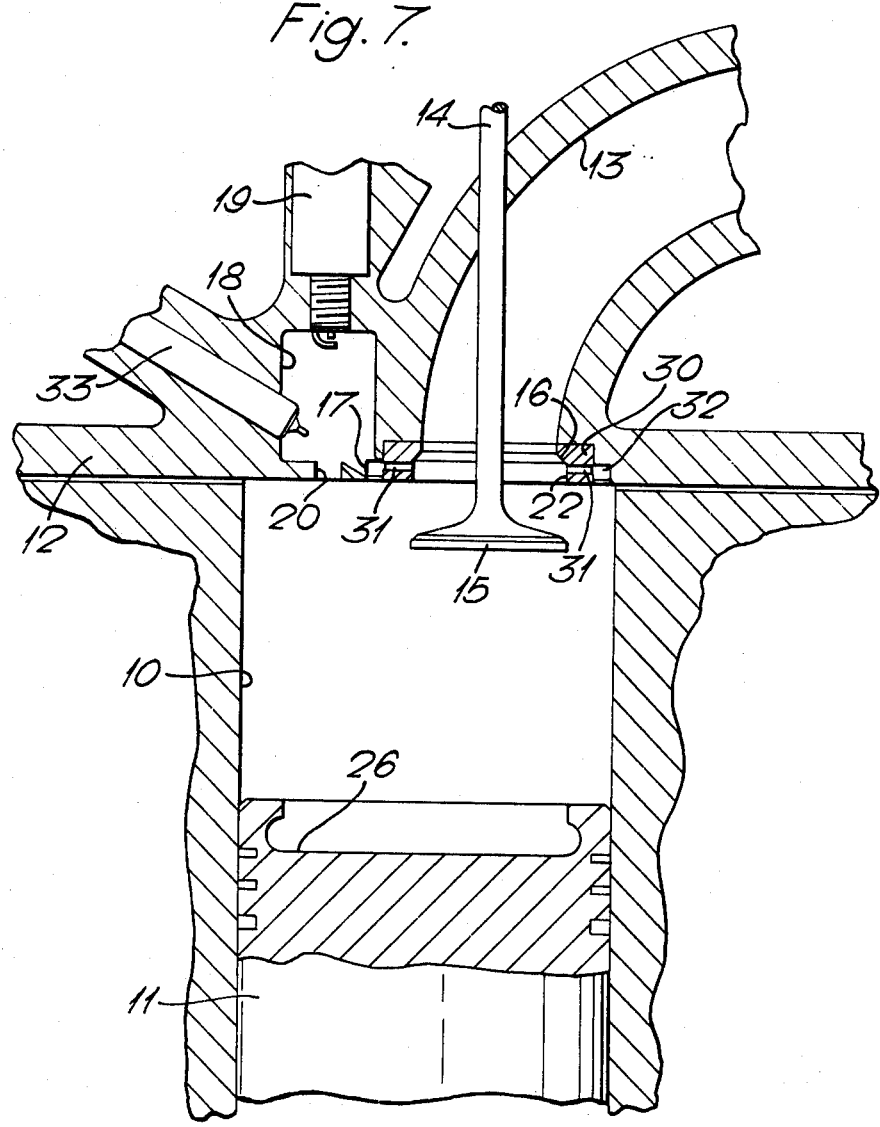

In the embodiments of FIGS. 5 to 7, the annular passage 32 in the cylinder head around the valve insert 30 could be formed in the valve insert itself.

I claim:

1. An internal combustion engine having at least one cylinder containing a reciprocable piston, an inlet passage for air or air/fuel mixture leading to the engine cylinder, means to ignite the air/fuel mixture, a branch passage leading from the inlet passage to the ignition means to deliver air or air/fuel mixture thereto, and a single valve for opening and closing both the inlet and branch passages, the valve having a first position for closing both said inlet and branch passages, a second position for opening said branch passage and closing said inlet passage, and a third position for opening both said branch and inlet passages.

2. An engine as claimed in claim 1 further comprising a carburetor and wherein said inlet passage is connected to said carburetor to supply air/fuel mixture to said inlet passage.

3. An engine as claimed in claim 1 wherein means are provided for injecting fuel into the inlet passage.

4. An engine as claimed in claim 2 further comprising a pre-combustion chamber and wherein said carburetor is arranged to supply an initial part of the charge of mixture which is fuel rich for each engine cycle so that the mixture supplied to said pre-combustion chamber is fuel rich and to supply the subsequent part of the mixture which is a weak mixture direct to said engine cylinder.

5. An engine as claimed in claim 1 wherein the valve controlling the inlet and branch passages is a poppet valve and an annular seat is formed in the inlet passage adjacent the cylinder to receive the head of the valve to close the passage, said branch passage extending from the wall of the inlet passage between said seat and the end of the inlet passage at the cylinder, the branch passage being located opposite the periphery of the valve head when the valve is closed so as to be closed by the valve head.

6. An engine as claimed in claim 1 wherein a pre-combustion chamber is provided in communication with the engine cylinder and said branch passage is arranged to deliver air or air/fuel mixture to the pre-combustion chamber.

7. An engine as claimed in claim 6 wherein the pre-combustion chamber is located at the end of the cylinder, the branch passage being connected direct to the pre-combustion chamber, the ignition means for igniting the air/fuel mixture being provided in the pre-combustion chamber and the chamber having an outlet orifice to the engine cylinder.

8. An engine as claimed in claim 7 wherein the piston crown is formed with a recess extending opposite the valve and the pre-combustion chamber in the cylinder head to receive air/fuel or burning mixture from the pre-combustion chamber and air from the inlet passage and the recess in the piston receiving the valve in the open position thereof when the piston approaches the top of its stroke.

9. An engine as claimed in claim 6 wherein the pre-combustion chamber comprises a recess formed in the outer face of the crown of the piston reciprocating in the cylinder.

10. An engine as claimed in claim 1 wherein said engine cylinder includes a cylinder head with an inlet port, and said inlet passage terminates in said inlet port, said single valve is a poppet valve, said branch passage comprises a slot formed in said cylinder head extending from one side of said inlet port to a location adjacent said ignition means, the end of said slot being closed by said poppet valve in said first position thereof and being opened to said inlet passage in said second position on initial opening movement of said poppet valve to feed air/fuel mixture to said ignition means, full opening of said poppet valve in said third position opening said inlet passage to feed air or air/fuel mixture to said cylinder.

11. An engine as claimed in claim 10 wherein said cylinder head further includes an annular insert formed at the outlet end said inlet passage, said annular insert includes an annular seat around the inner periphery thereof to receive said poppet valve in said first position thereof, and said slot extends through said annular seat to said inlet passage within said annular seat.

12. An engine as claimed in claim 10 wherein the slot has a smoothly curved bottom wall which converges towards the surface of the cylinder head over the pre-combustion chamber to direct air or air/fuel mixture into said chamber.

* * * * *